US012664706B2

(12) United States Patent
Srinivasan et al.

(10) Patent No.: US 12,664,706 B2
(45) Date of Patent: Jun. 23, 2026

(54) USING A VISUAL LANGUAGE MODEL AND A GENERATIVE ARTIFICIAL INTELLIGENCE MODEL TO EVALUATE AND CORRECT AN IMAGE OF A COLLECTION OF ITEMS

(71) Applicant: Maplebear Inc., San Francisco, CA (US)

(72) Inventors: Prithvishankar Srinivasan, Seattle, WA (US); Orrin Naylor, Mohave County, AZ (US); Jatin Jain, Issaquah, WA (US); Shishir Kumar Prasad, Fremont, CA (US); Katherine Tsen, New York, NY (US); Riddhima Sejpal, Dublin, CA (US)

(73) Assignee: Maplebear Inc., San Francisco, CA (US)

( * ) Notice: Subject to any disclaimer, the term of this patent is extended or adjusted under 35 U.S.C. 154(b) by 136 days.

(21) Appl. No.: 18/818,277

(22) Filed: Aug. 28, 2024

(65) Prior Publication Data

US 2026/0065545 A1     Mar. 5, 2026

(51) Int. Cl.
*G06T 11/60* (2026.01)
*G06V 10/44* (2022.01)

(52) U.S. Cl.
CPC .............. *G06T 11/60* (2013.01); *G06V 10/44* (2022.01)

(58) Field of Classification Search
CPC ..... B01L 2300/0861; B01L 2400/0605; B01L 3/502738; C12M 23/16; C12M 29/10; C12M 29/14; C12M 33/00; G01N 1/18
See application file for complete search history.

(56) References Cited

U.S. PATENT DOCUMENTS

| | | | |
|---|---|---|---|
| 11,423,650 B2 * | 8/2022 | Li | ........................ G06V 10/426 |
| 2007/0064120 A1 * | 3/2007 | Didow | ..................... H04N 5/84 |
| | | | 348/229.1 |
| 2019/0392487 A1 | 12/2019 | Duke | |
| 2022/0125359 A1 * | 4/2022 | Persaud | ................. A61B 5/165 |
| 2022/0309702 A1 * | 9/2022 | Deng | ..................... G06F 3/013 |
| 2024/0265274 A1 | 8/2024 | Parasnis et al. | |
| 2024/0282079 A1 | 8/2024 | Saraee et al. | |

OTHER PUBLICATIONS

PCT International Search Report and Written Opinion, PCT Application No. PCT/US2025/031961, Aug. 19, 2025, 13 pages.

* cited by examiner

*Primary Examiner* — Ming Wu
(74) *Attorney, Agent, or Firm* — Fenwick & West LLP

(57) ABSTRACT

An online system generates images for collections of items using an image generation model. To ensure a generated image accurately reflects a collection of items, the online system determines a type of the collection and selects a template including evaluation questions associated with the determined type. Evaluation questions are curated to determine accuracy of the content of a generated image for the collection. By applying a visual learning model to the questions in the selected template and the generated image, the online system identifies discrepancies between the image and the collection of items from the output of the vision language model. Subsequently, the online system prompts the image generation model to create an updated image for the collection that does not include the identified discrepancies. The online system may repeat the discrepancy identification and image modification until no discrepancies are found in the generated image.

16 Claims, 4 Drawing Sheets

USING A VISUAL LANGUAGE MODEL AND A GENERATIVE ARTIFICIAL INTELLIGENCE MODEL TO EVALUATE AND CORRECT AN IMAGE OF A COLLECTION OF ITEMS

BACKGROUND

When presenting one or more interfaces identifying items to users, many online systems present information describing collections of items including an image of a product from combining items in a collection of items. A collection of items may include a plurality of items capable of being combined or otherwise used together. Further, a collection of items may include instructions for a user combining the items in the collection to create a product from the items. For example, an online system offering food items maintains various recipes, with each recipe including multiple food items and instructions for combining the identified food items to create a product (e.g., a dish).

Presenting an image of a product from combining items in a collection of items increases a likelihood of a user obtaining items included in the collection from the online system. For example, presenting an image of a product from combining food items in a recipe increases a likelihood of a user selecting the food items in the recipe to create the presented product. To efficiently generate an image for a collection of items, many online systems leverage image generation models that receive a prompt including items in the collection to generate an image based on the prompt. For example, an online system generates a prompt for an image generation model to create an image of a completed product of a recipe that includes multiple food items.

However, an image generated by an image generation model may not accurately represent items in the collection of items. For example, an image generation model may generate an image for a recipe that includes additional food items that are not included in the recipe. As another example, an image of a recipe generated by an image generation model may not present one or more food items included in the recipe. Such discrepancies between images generated by an image generation model and collections of items discourage a user from selecting items based on the collection of items. Conventional online systems rely on manual comparison of images generated by an image generation model to corresponding collections of items to identify discrepancies between a generated image and a corresponding collection of items. This manual review of generated images increases an amount of time and resources expended by an online system when generating model-generated images for various collections of items.

SUMMARY

In accordance with one or more aspects of the disclosure, an online system allows users to obtain various items via the online system. For example, a user creates an order including one or more items offered by the online system. Subsequently, the online system fulfills the order for a user by obtaining the items included in the order and having the items delivered to the user. For example, the online system allocates an order from the user to a picker, who obtains items included in the order from a source and delivers the items to a location specified in the order.

To simplify creation of orders, the online system may maintain various collections of items that each include a plurality of items. The collection of items also includes descriptive information about the collection, such as keywords, categories, one or more users associated with the collection, etc. In various embodiments, the descriptive information included in a collection of items also includes instructions for combining items in the collection to create a product. For example, a collection of items is a recipe identifying different food items and including instructions for combining the food items in the recipe to create a product (e.g., a dish from combining the food items). In various embodiments, the descriptive information includes different or additional information than instructions for combining items in the collection of items.

When presenting information describing the collection of items to users via an interface, the online system presents an image associated with the collection of items along with other information describing the collection of items. Presenting the image associated with the collection of items increases a likelihood of the user obtaining items included in the collection of items. In various embodiments, the image associated with the collection of items depicts a product resulting from combining items included in the collection of items. For example, an image associated with a collection of items comprising a recipe is an image of a dish resulting from combining food items in the recipe based on instructions included in the recipe.

To generate an image associated with the collection of items for presentation to users, the online system applies a generative artificial intelligence (AI) model, such as a large language model (LLM), to a prompt including the items included in the collection, the descriptive information included in the collection of items, and one or more formatting instructions for an image generation prompt. In various embodiments, one or more formatting instructions specify that the image generation prompt include: a name of the collection, one or more items in the collection to present in an image, characteristics of content to include in the image (i.e., a background of the image, etc.), or other information to include in the image generation prompt. The generative model leverages relationships between portions of text input learned during pre-training to generate the image generation prompt based on the received items and descriptive information from the collection of items subject to the one or more formatting instructions. In various embodiments, the image generation prompt specifies one or more specific items from the collection of items (e.g., one or more primary items in the collection of items), one or more characteristics of the collection of items, information identifying the collection of items, or other information identified from the items and the descriptive information included in the collection of items to include in the candidate image.

The online system applies an image generation model to the image generation prompt to generate a candidate image for the collection of items. The image generation model is a trained generative model configured to receive text as input and to generate an image based on the received text. In various embodiments, the image generation model was pre-trained through application to a training corpus comprising multiple pairs that each include an image and text corresponding to the image. While the image generation model accounts for items in the collection or characteristics of the collection included in the image generation prompt when generating the candidate image, the image generation model may result in discrepancies between items included in the collection and the candidate image. An example discrepancy is the candidate image not visually presenting one or more items included in the collection. Another example discrepancy is the candidate image presenting one or more additional items that are not included in the collection of items. Hence, discrepancies cause content presented by the candidate image to differ from the items included in the collection of items, preventing the candidate image from accurately depicting the items included in the collection. Discrepancies between the candidate image and the collection of items may reduce a likelihood of a user basing an order for items on the collection of items. Conventional online systems use manual comparison of a candidate image to the collection of items to identify discrepancies between the candidate image and the collection of items, increasing an amount of time and an amount of resources used to determine an image associated with the collection of items.

To mitigate potential discrepancies between the candidate image and the collection of items, the online system determines a type of the collection of items and selects a template associated with the determined collection. A type of collection includes collections having one or more common characteristics. For example, different types correspond to collections having different types of items or having different instructions for combining items. In some embodiments, a collection includes one or more primary items, and a type of collection corresponds to a specific primary item. Alternatively or additionally, different types of collections of items correspond to different instructions in a collection for combining items in the collection. Other types of collections of items correspond to other characteristics of collections of items, allowing the online system to account for various characteristics of the collection of items when determining the type of the collection of items. In various embodiments, the online system applies a trained classification model to the items in the collection of items and to the descriptive information in the collection of items, with the trained classification model generating a type of the collection of items. Alternatively, the online system compares items in the collection of items or other descriptive information in the collection of items to characteristics associated with different types and determines the type associated with a maximum amount of characteristics matching the items or the descriptive information of the collection of items as the type of the collection of items.

A type of collection of items is associated with a template that includes a set of evaluation questions for an image of a collection of items having the type. Different types of collections of items are associated with different templates, with different templates including different evaluation questions. Each evaluation question in a template identifies a visual feature of an image of a collection, and different evaluation questions correspond to different visual features of the image. A "visual feature" of an image is a generic description of certain content included in the image that includes characteristics of one or more items visible in an image. For example, a visual feature identifies a category of an item visible in the image and one or more attributes of the item of the identified category visible in the image. In an example, an evaluation question identifies a category including a specific item in the collection as well as a particular attribute of the item included in the identified category. The attribute of an item in a category identified by the evaluation question may be based on the collection of items in some embodiments. For example, an evaluation question identifies a category of items and indicates that an item of the identified category matches at least one item included in the collection of items. Maintaining different templates for different types of collections of items allows the online system to account for variations in visual features to include in images for different types of collections of items. Because of variations in included items and descriptive information in different collections of items, different visual features in images provide users with accurate representations of different types of collections of items. For example, accurate representation of a collection comprising a pasta recipe includes different visual features in an image than the visual features included in an image generated for a different collection comprising a drink recipe.

Based on the evaluation questions in the template associated with the type of the collection of items and the candidate image for the collection of items, the online system determines whether the candidate image has one or more discrepancies from the collection. For example, the online system applies a vision language model to each combination of an evaluation question in the selected template and the candidate image to generate evaluation results for accuracy of the candidate image, with the evaluation results indicating whether the candidate image has one or more discrepancies between the collection of items and the candidate image. In various embodiments, the online system generates an evaluation prompt for each evaluation question included in the selected template using the generative model as well as the items in the collection of items and the descriptive information in the collection of items. For example, the online system applies the generative model to a prompt including an evaluation question as well as the items of the collection of items or the descriptive information in the collection of items to generate an evaluation prompt for the evaluation question. The evaluation prompt maps a generic description of a visual feature in the evaluation question to one or more specific items of the collection of items or characteristics of the collection of items. Hence, an evaluation prompt based on an evaluation question includes one or more specific items from the collection, or one or more characteristics of the collection, corresponding to each generic description of a visual feature included in an image, so the evaluation prompt is tailored to the specific collection of items.

The vision language model applied to each combination of the candidate image and an evaluation prompt (or evaluation question), generates an output for the evaluation prompt based on the candidate image. The vision language model comprises a multimodal generative model that receives an image and text data as input. The vision language model generates an output based on the received image and text data. For example, the vision language model generates text data based on the received image and text data. The vision language model is pre-trained on a set of multimodal training data, with the multimodal training data comprising an image and text corresponding to the image. In some embodiments, the vision language model is pre-trained to perform one or more specific tasks, such as visual question answering, where the vision language model receives an image and a question about the image and generates an answer to the question based on the image. For example, an evaluation prompt queries the vision language model to indicate whether the candidate image displays an item from the collection of items corresponding to a visual feature, with an evaluation result comprising the indication whether the candidate image displays the item from the collection of items from the vision language model. As another example, the evaluation results comprise identifiers of items included in the collection of items identified by an evaluation prompt that are not visible in the candidate image. In another example, the evaluation results comprise identifiers of items included in the candidate image that are not included in the collection of items. Alternative or additional types of evaluation results may be generated by the vision language model in various embodiments.

The online system determines whether the evaluation results satisfy one or more criteria to determine whether the candidate image has one or more discrepancies from the collection of items. For example, the online system determines whether the evaluation results indicate less than a threshold number of items included in the collection of items are not visible in the candidate image. In another example, the online system determines whether less than a threshold number of additional items not in the collection of items are visible in the candidate image. However, in other embodiments, the online system determines whether the evaluation results 465 satisfy alternative or additional criteria.

The candidate image not satisfying a threshold amount of the criteria indicates the candidate image includes one or more discrepancies from the collection of items. In various embodiments, the online system stores information describing one or more criteria that the candidate image does not satisfy, with a criterion that the candidate image does not satisfy identifying a discrepancy between the candidate image and the collection of items. For example, the online system stores an identifier of an item identified by an evaluation prompt that is not visible in the candidate image. As another example, the online system stores an identifier of an additional item included in the candidate image that is not included in the collection of items. In an additional example, the online system stores an identifier of an attribute of an item identified by an evaluation prompt that is not visible in the candidate image. Hence, determining whether the candidate image satisfies one or more criteria identifies one or more discrepancies between the candidate image and the collection of items.

In response to determining that the evaluation results satisfy the criteria or satisfy a threshold amount of the criteria, the online system stores the candidate image as an image associated with the collection of items. Evaluation results that satisfy at least a threshold amount of the criteria indicate the candidate image has less than a threshold number of discrepancies from the collection of items, so the candidate image accurately represents the collection of items. The online system stores the candidate image as the image associated with the collection of items. Subsequently, the online system displays the image associated with the collection of items as a portion of information identifying the collection of items to users. Leveraging the set of evaluation questions in the template selected for the collection 400 of items and the vision language model allows the online system to confirm that the candidate image generated by the image generation model has less than a threshold number of discrepancies from the collection of items, which confirms that the candidate image accurately represents the collection of items.

However, in response to determining the evaluation results do not satisfy the criteria, the online system applies the generative model to one or more discrepancies identified from comparing the evaluation results to the one or more criteria. In various embodiments, the online system generates an image generation modification prompt including the previously generated image generation prompt, the items in the collection of items, the descriptive information of the collection of items (e.g., the instructions for combining the items in the collection), the identified one or more discrepancies, and an instruction to modify the image generation prompt to remedy the identified one or more discrepancies between the candidate image and the collection of items.

Subsequently, the online system generates a modified candidate image by applying the image generation model to the modified image generation prompt.

The online system generates evaluation results for the modified candidate image by applying the vision language model to each combination of the modified candidate image and an evaluation prompt corresponding to an evaluation question in the selected template. The online system determines whether the evaluation results for the modified candidate image satisfy the one or more criteria, as further described above. In response to determining the evaluation results for the modified candidate image satisfy the one or more criteria (e.g., satisfy at least a threshold amount of the criteria), the online system stores the modified candidate image as the image associated with the collection of items. However, in response to determining the evaluation results for the modified candidate image do not satisfy the criteria (e.g., do not satisfy at least a threshold amount of the criteria), the online system determines the modified candidate image includes greater than a threshold number of discrepancies from the collection of items and generates an additional modified image generation prompt using the generative model and the identified discrepancies from comparison of the evaluation results of the modified candidate image to the one or more criteria, as further described above. Using the additional modified image generation prompt and the image generation model, the online system generates an additional modified candidate image. The online system generates evaluation results for the additional modified candidate image based on the additional modified candidate image and the evaluation questions from the selected template, and the online system determines whether the evaluation results for the additional modified candidate image satisfy the one or more criteria, as further described above.

Hence, the online system may iteratively modify the candidate image generated by the image generation model for the collection of items based on discrepancies between the candidate image and the collection of items identified by comparing the candidate image to evaluation visual features to present in an image for the collection of items identified by one or more evaluation questions in the selected template. In some embodiments, the online system modifies the candidate image until a modified candidate image has evaluation results satisfying the one or more criteria (or satisfying at least a threshold amount of the one or more criteria) to minimize discrepancies between the modified candidate image stored as the image associated with the collection of items. Alternatively, the online system modifies the candidate image a predetermined number of times before storing the resulting modified candidate image 440 as the image associated with the collection of items. This leverages the vision language model and the generative model to automate generation of the candidate image for the collection of items and modification of the candidate image to reduce discrepancies with the collection of items prior to storing the generated image in association with the collection of items.

DETAILED DESCRIPTION

Figure 1:
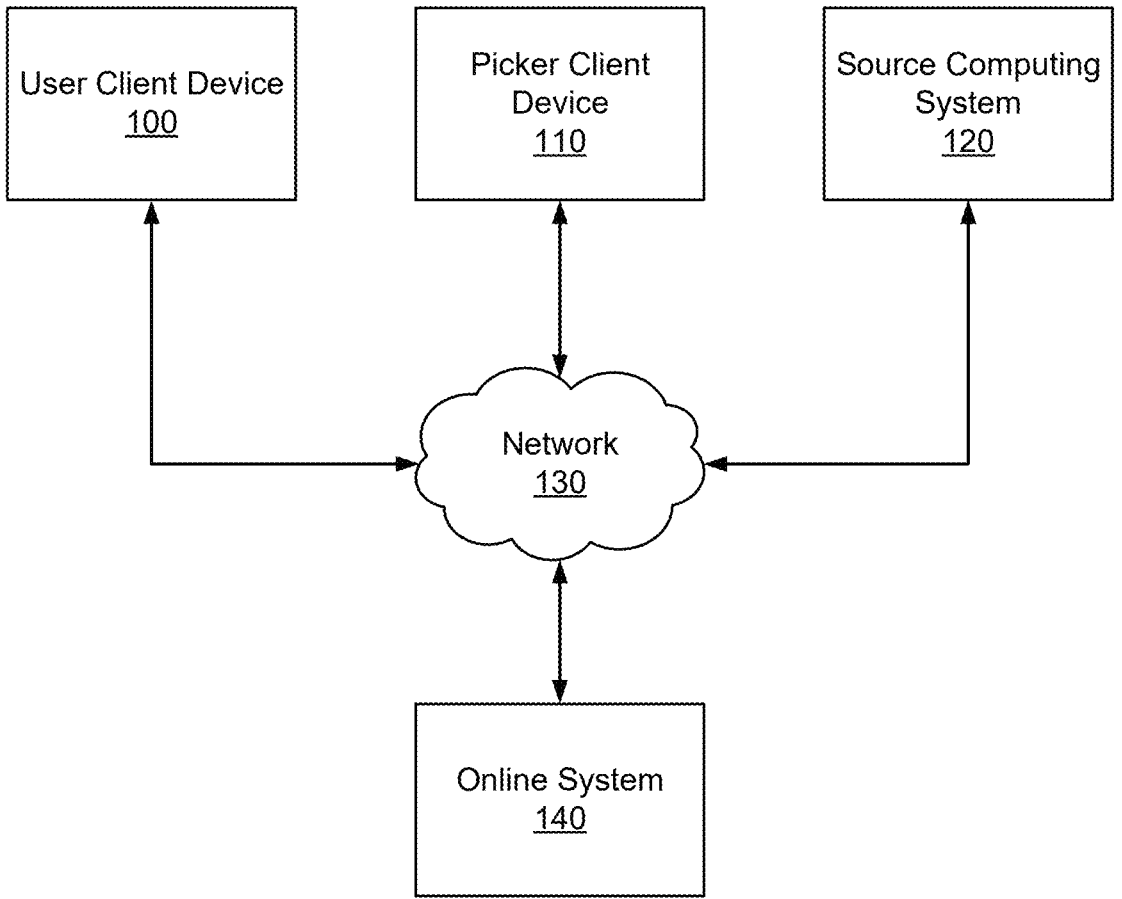
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, one picker client device 110, and one source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." A "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

In various embodiments, the ordering interface presents information identifying one or more collections of items to the user. A collection of items includes multiple items as well as descriptive information about combining the items in the collection. For example, a collection of items includes instructions for combining the items in the collection to create a product. As an example, a collection of items is a recipe that includes multiple food items and instructions for combining the food items into a product comprising a dish. Information identifying a collection of items presented by an ordering interface includes an image associated with the collection of items that increases a likelihood of the user obtaining items comprising the collection of items. In various embodiments, the image associated with the collection of items comprises an image of a product from combining items included in the collection. For example, an image associated with a collection comprising a recipe is an image of a dish resulting from combining food items in the recipe based on instructions included in the recipe.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order.

Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, a warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user's client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140. The online system 140 is described in further detail below with regards to FIG. 2.

Figure 2:
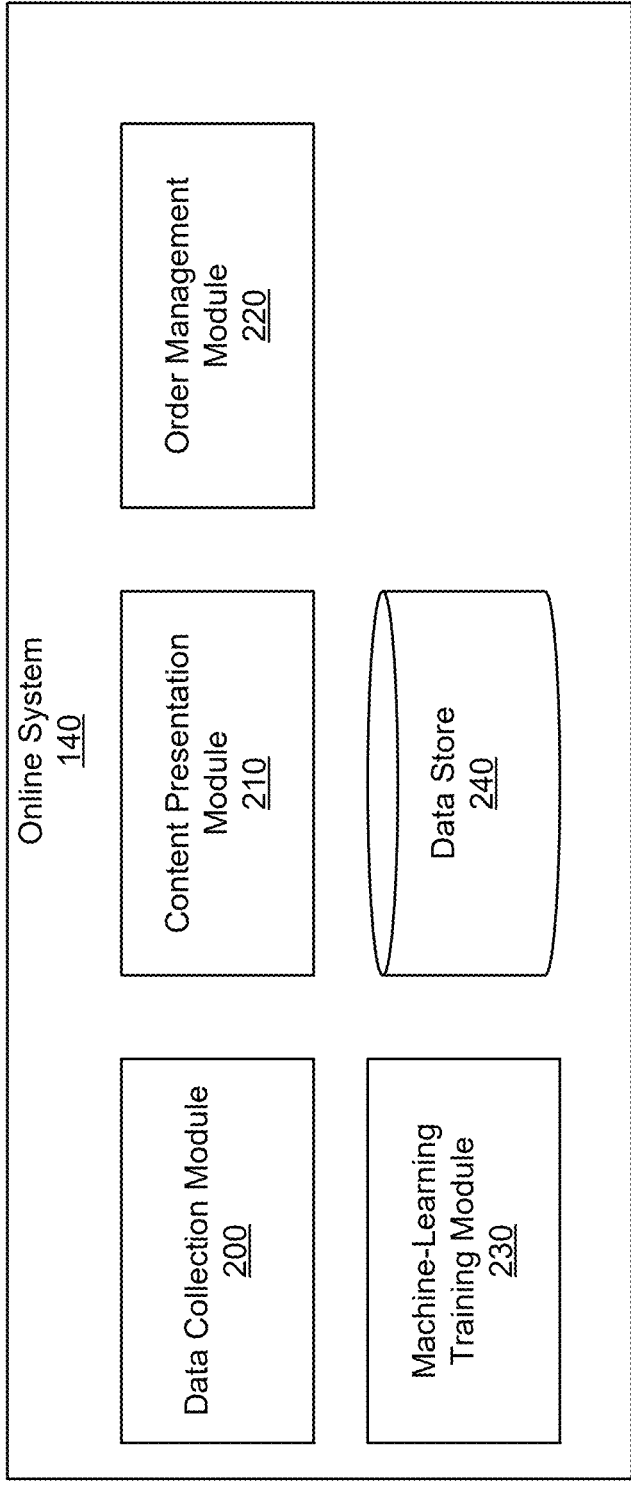
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from a source computing system 120, a picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The content presentation module 210 may generate an interface including one or more collections of items for presentation to a user via a user client device 100. For example, the interface includes information identifying one or more items as well as information identifying one or more collections of items. As another example, the interface includes information identifying multiple collections of items. Example information identifying a collection of items includes a title of the collection of items, a description of the collection of items, one or more keywords associated with the collection of items, an image associated with the collection of items, or any combination thereof.

In various embodiments, presenting an image associated with a collection of items increases a likelihood of a user selecting items included in the collection for an order. For example, an image associated with a collection of items depicts a product from combining items included in the collection of items to provide users with an incentive to obtain items included in the collection. As further described below in conjunction with FIGS. 3 and 4, the content presentation module 210 automatically generates an image associated with a collection of items based on items included in the collection of items and descriptive information included in the collection of items. In various embodiments, the content presentation module 210 applies a generative model, such as a large language model (LLM), to a prompt comprising one or more formatting instructions, the items included in the collection of items, and the descriptive information included in the collection of items. Subsequently, the content presentation applies an image generation model to the image generation prompt, which generates a candidate image for the collection of items.

Although the image generation prompt includes the items included in the collection of items and the descriptive information included in the collection of items, the candidate image generated based on the image generation prompt may include one or more discrepancies from the collection of items. For example, the image generation model includes one or more additional items in the candidate image that are not included in the collection of items. As another example, one or more items included in the collection of items are not visible in the candidate image. Discrepancies between the candidate image and the collection of items prevent the candidate image from accurately representing the collection of items, and such inaccurate representation of the collection of items decreases a likelihood of users selecting items from the collection of items via the online system 140.

To mitigate discrepancies between the candidate image and a collection of items, the content selection module 210 determines a type of the collection of items and selects a template associated with the determined type. As further described below in conjunction with FIGS. 3 and 4, a template associated with a type includes a set of evaluation questions for assessing an image for a collection of items having the type. Each evaluation question identifies a visual feature for inclusion in an image. A "visual feature" of an image is a generic description of certain content included in the image that includes characteristics of one or more items visible in an image. For example, a visual feature identifies a category of an item visible in the image and one or more attributes of the item of the identified category visible in the image.

As further described below in conjunction with FIGS. 3 and 4, the content selection module 210 generates evaluation results for accuracy of the candidate image by applying a vision language model to different combinations of the candidate image and evaluation questions. The vision language model is configured to receive a text input and an image and to generate output text based on the image and the text input. For example, the vision language model outputs an indication of whether the input image has one or more characteristics specified by the text input. Based on evaluation results, the content selection module 210 determines whether the candidate image has discrepancies from the collection of items. In response to determining the candidate image has at least a threshold number of discrepancies from the collection of items, the content selection module 210 generates an image generation modification prompt for the image generation model based on the discrepancies identified by the vision language model. As further described below in conjunction with FIGS. 3 and 4, the content selection module 210 uses the image generation modification prompt to generate a modified candidate image that is evaluated for accuracy against the collection of items using the evaluation questions from the selected template and the vision language model. Hence, the content selection module 210 iteratively modifies a candidate image to remove discrepancies from the collection of items identified by a vision language model, enabling automatic generation of an image stored in association with the collection of items that minimizes discrepancies between the image and the collection of items.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module

220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140.

The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

In various embodiments, the machine learning training module 230 obtains a vision language model comprising a multimodal generative model that receives an image and text data as input. The vision language model generates an output based on the received image and text data. For example, the vision language model generates text data based on the received image and text data. As another example, the vision language model generates an output image based on the received image and text data. The vision language model is pre-trained on a set of multimodal training data, with the multimodal training data comprising an image and text corresponding to the image. Text corresponding to an image in the multimodal training data may be captions describing the image, labels of objects included in the image, or other descriptive information about the image. In some embodiments, the vision language model is pre-trained to perform one or more specific tasks, such as visual question answering, where the vision language model receives an image and a question about the image and generates an answer to the question based on the image. Pre-training of the vision language model for visual question answering may be performed by applying the vision language model to training examples each including a question and an image, with each training example labeled with an answer corresponding to the question included in the training example.

Additionally, the machine learning training module 230 trains or obtains one or more generative models. A generative model, such as a large language model (LLM), receives an input including a prompt and generates output based on the received input. For example, a generative model is a large language model (LLMs) previously trained on a large text corpus to learn relationships between different portions of text, such as between different words. Based on the previously learned relationships, the LLM generates output text from text received as input based on a prompt received as input. For example, a generative model receives a prompt including one or more formatting instructions and text data as input and generates output text in a format specified by the one or more formatting instructions and based on the input text and previously learned relationships between various text.

In some embodiments, a generative model is an image generation model pre-trained on a training corpus including pairs of images and text data. For example, each pair includes an image and a text caption or other text describing the image. From the training corpus, the image generation model learns relationships between various text data and various images. The image generation model leverages the learned relationships to generate an image in response to received text input, allowing generation of an image based on received text input.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 3:
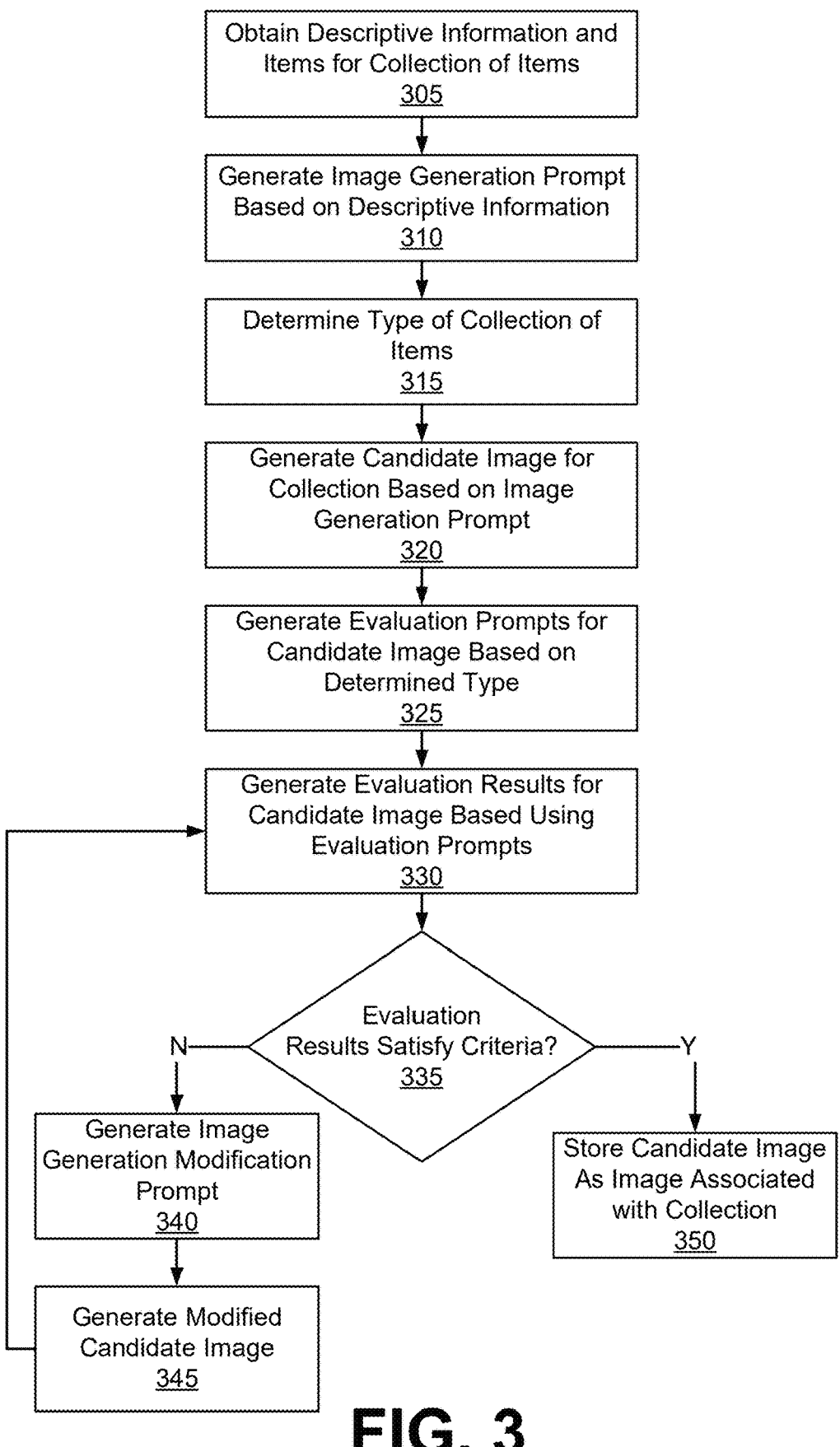
FIG. 3 illustrates a flowchart of a method for generating an image of a collection of items by modifying an image generated by an image generation model based on evaluation results of the image generated by a vision language model, in accordance with one or more embodiments.

FIG. 3 is a flowchart of a method for generating an image of a collection of items by modifying an image generated by an image generation model based on evaluation results of the image generated by a vision language model, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

An online system 140 maintains information describing various items available to users via the online system 140. For example, the online system 140 includes an item catalog for each of one or more sources from which the online system 140 obtains items. An item catalog for a source identifies attributes of each item offered by the source and descriptive information about each item offered by the source. Based on attributes of items or descriptive information of items, the online system 140 generates information identifying various items presented to users via one or more interfaces.

Based on interactions with information identifying one or more items, a user generates an order for fulfillment by the online system 140. For example, the user selects information identifying one or more items presented by the online system 140 to include the one or more items in an order. To simplify inclusion of items in various orders, the online system 140 also maintains one or more collections of items, with a collection including a plurality of items. A collection of items may also include descriptive information, such as instructions for combining items included in the collection, keywords associated with the collection, or other information about the collection. In various embodiments, a collection of items has a corresponding product resulting from a user combining items included in the collection. Descriptive information included in the collection may include instructions for combining items in the collection to create the corresponding product. For example, a collection of items is a recipe including multiple food items and instructions for combining the food items of the recipe to create a product comprising a dish.

Presenting information identifying one or more collections of items to users simplifies selection of items included in a collection by a user or provides the user with a suggestion for additional items to include in an order based on a collection of items. In various embodiments, information identifying a collection presented to users includes an image of a product corresponding to a collection of items, or another image corresponding to the collection of items, along with a subset of the descriptive information of the collection of items (e.g., a title of the collection, a text description of the collection, etc.). Presenting an image associated with a collection of items increases a likelihood of a user viewing the collection or including one or more items of the collection in an order. In various embodiments, the online system 140 leverages various trained models to generate an image for a collection of items based on the items included in the collection and other descriptive information about the collection. Hence, the online system 140 automatically generates an image associated with a collection of items based on items included in the collection and descriptive information of the collection in various embodiments.

For a collection of items, the online system 140 obtains 305 items included in the collection and descriptive information about the collection. In various embodiments, the online system 140 extracts the items included in the collection and the descriptive information of the collection from the collection. Alternatively, the online system 140 extracts the items included in the collection from the collection and obtains 305 the descriptive information of the collection from another source (e.g., a third party system, an entity associated with the recipe, an entity associated with one or more items included in the collection, etc.). For example, the collection of items is a recipe, so the online system 140 obtains 305 items included in the recipe, a style of cooking for the recipe, a title or a name of the recipe, one or more colors included in the product of the recipe, instructions for combining items in the recipe, or other descriptive information from the recipe itself.

Based on the items included in the collection and the descriptive information of the collection, the online system 140 generates 310 an image generation prompt for an image generation model. In various embodiments, the online system 140 generates a prompt for a large language model (LLM), or other generative model, that includes the items from the collection, the descriptive information about the collection and one or more instructions for generating the image generation prompt. As further described above in conjunction with FIG. 2, the LLM, or other generative model, is pre-trained on a large text corpus to learn relationships between different portions of an input, such as different words or phrases in the input, and to generate output based on the input and the learned relationships. By leveraging the relationships between portions of text learned during pre-training, the LLM generates text output based on a received prompt including text input and one or more instructions. For example, the LLM receives a prompt including formatting instructions for the image generation prompt, the items included in the collection, and the descriptive information of the collection. In some embodiments, the formatting instructions identify characteristics of the collection to be visually identifiable in an image determined from the items included in the collection and the descriptive information of the collection, as well as a syntax structure of the image generation prompt. For example, one or more formatting instructions specify that the image generation prompt include: a name of the collection, one or more items in the collection to present in an image, characteristics of content to include in the image (i.e., a background of the image, etc.), or other information to include in the image generation prompt.

Additionally, the online system 140 determines 315 a type of the collection. A type of collection includes collections having one or more common characteristics. For example, different types correspond to collections having different types of items or having different instructions for combining items. In some embodiments, a collection includes one or more primary items, and a type of collection corresponds to a specific primary item. Alternatively or additionally, different types of collections of items correspond to different instructions in a collection for combining items in the collection. Other types of collections of items correspond to other characteristics of collections of items, allowing the online system 140 to account for various characteristics of the collection of items when determining 315 the type of the collection of items.

In some embodiments, the online system 140 determines 315 the type of the collection of items by applying a trained classification model to the collection, with the classification model generating a type corresponding to the collection. A classification model may be based on an embedding of the collection that represents the collection in a high-dimensional space, and the classification model determines 315 the type for the collection based on the embedding of the collection. For example, the classification model is trained through application to a set of classification training examples that each include an embedding of a training collection of items, and each have a label indicating a type of a corresponding training collection of items. Using a backpropagation process further described above in conjunction with FIG. 2, the online system 140 modifies parameters of the classification model and stores the trained classification model to determine 315 a type of a collection of items based on an embedding of the collection.

In other embodiments, the online system 140 stores associations between different types of collections and different characteristics of collections of items. The online system 140 compares characteristics of the collection of items to characteristics associated with different types and determines 315 a type for the collection of items based on characteristics of the collection matching characteristics associated with types of collections. For example, the online system 140 determines 315 a type having a maximum amount of characteristics matching characteristics of the collection of items as the type of the collection of items. For example, the online system 140 determines 315 the collection of items has a type associated with a maximum percentage of characteristics matching characteristics of the collection of items.

Each type of collection of items maintained by the online system 140 is associated with a template that includes a set of evaluation questions for an image of a collection of the type. Each evaluation question in a template identifies a visual feature of an image of a collection, and different questions correspond to different visual features of the image. A "visual feature" of an image is a generic description of certain content included in the image that includes characteristics of one or more items visible in an image. For example, a visual feature identifies a category of an item visible in the image and one or more attributes of the item of the identified category. In an example, an evaluation question identifies a category including a specific item in the collection as well as a particular attribute of the item included in the identified category. The attribute of an item in a category identified by the evaluation question may be based on the collection of items in some embodiments. For example, an evaluation question identifies a category of items and indicates that an item of the identified category matches at least one item included in the collection of items.

As different types of collections have different items and differently combine the items, different visual features in an image determine whether the image accurately represents different types of collections of items. For example, having certain visual features visible in an image for a collection comprising a pasta recipe causes the image to accurately represent the pasta recipes, while having different visual features visible in an additional image for a collection comprising a drink recipe causes the additional image to accurately represent the drink recipe. Maintaining different templates for different types of collections accounts for variations in visual features in images representing collections including different items or including different instructions for combining items.

In various embodiments, the online system 140 obtains evaluation questions for a template from one or more users and stores the obtained set of evaluation questions in the template associated with a type of collection. Alternatively, the online system 140 obtains evaluation questions for a template from a third party system (e.g., a source computing system 120, a third party system of an entity associated with the collection of items, etc.). The online system 140 may update a set of evaluation questions included in a template over time in various embodiments.

The online system 140 generates 320 a candidate image for the collection of items by applying a trained image generation model to the image generation prompt. The image generation model is a multimodal generative model configured to receive text data as an input and to generate an image based on the received text data. For example, the image generation model is a generative adversarial network that receives a text description of an image and generates an image based on the received text description. The text description includes features of characteristics to be visible in the image, and the image generation model generates an image having the characteristics or features included in the text description visible. As the image generation prompt includes characteristics of the collection of items to be visible in an image of the collection of items, the image generation model leverages the image generation prompt to determine content to be visible when generating 320 the candidate image for the collection of items. The candidate image includes visual features presented to users that are based on the characteristics of the collection included in the image generation prompt.

While the image generation prompt specifies characteristics of the collection of items to be visible in the candidate image, the image generation model may include additional visual features in the candidate image that are not included in the image generation prompt or may have one or more characteristics from the image generation prompt obscured in the candidate image. These differences between the candidate image and the characteristics in the image generation prompt are discrepancies between the candidate image and the collection of items. Such discrepancies cause the candidate image to obscure or distract from the characteristics included in the image generation prompt. To compensate for discrepancies between characteristics in the candidate image and characteristics identified by the image generation prompt, the online system 140 retrieves a template associated with the determined type of the collection of items and generates 325 evaluation prompts based on the evaluation questions included in the template. As further described above, each evaluation question identifies a visual feature of an image of a collection having the type associated with the template. As each evaluation question corresponds to a visual feature in an image of a collection having the type, various evaluation prompts generated 325 from the evaluation questions assess different visual features in the candidate image based on the evaluation questions.

In various embodiments, the online system 140 generates 325 an evaluation prompt by applying a generative model, such as a large language model, to an evaluation question, to items included in the collection, and to the descriptive information about the collection. As further described above, in various embodiments, each evaluation question includes a generic description of a visual feature of the image of the collection, so applying the generative model to the evaluation question and to the item included in the collections as well as the descriptive information about the collection generates 325 an evaluation prompt that includes specific items from the collection, specific characteristics of the collection, or specific attributes of one or more items in the collection corresponding to a generic description of the visual feature. Hence, an evaluation prompt includes specific items, characteristics, or attributes of items of the collection that the generative model determined correspond to a generic description of a visual feature of the image in an evaluation question. This allows an evaluation prompt to be specific to the collection of items, while a corresponding evaluation question in a template evaluation question provides a more generalized description of a visual feature for application to a range of collections of items. For example, applying the generative model to an evaluation question of "Does the image include the correct cut of meat" to a collection of items including chicken thighs generates 325 an evaluation prompt of "Does the image include chicken thighs," with the relationships between portions of text learned by the generative model refining the more generic identification of "correct cut of meat" in the evaluation question to the chicken thighs included in the collection of items.

Based on the candidate image and the evaluation prompts generated 325 from the evaluation questions, the online system 140 generates 330 evaluation results for accuracy of the candidate image. In various embodiments, the online system 140 applies a vision language model to each combination of an evaluation prompt and the candidate image to generate 330 the evaluation results for the candidate image. Alternatively, the online system 140 applies the vision language model to each combination of an evaluation question and the candidate image to generate 330 the evaluation results. A vision language model is a multimodal model that receives different types of input and generates an output based on the received input. In various embodiments, the vision language model generates an image embedding for a received image, generates a text embedding for received text data, and combines the image embedding and text embedding as input to a plurality of layers comprising parameters to generate an output. For example, a vision language model receives an image and text data as input and generates text data as an output. In another example, a vision language model receives an image and text data as input and generates an image as an output. In various embodiments, each evaluation prompt is a question to identify a visual feature in the candidate image, and an evaluation result for an evaluation prompt comprises an answer to the evaluation prompt generated by the vision language model based on the candidate image.

Applying the vision language model to each combination of the candidate image and an evaluation prompt generates 330 evaluation results for accuracy of the candidate image. The presence or absence of visual features corresponding to different evaluation questions in the candidate image affect the accuracy with which the candidate image represents the collection of items. An evaluation result for an evaluation prompt provides an indication whether the candidate image satisfies a visual feature corresponding to the evaluation prompt. For example, an evaluation result indicates whether the candidate image includes a visual feature corresponding to the evaluation prompt. In another example, an evaluation result indicates whether the candidate image includes an additional item that is not included in the collection of items. As another example, an evaluation result indicates a number of visual features corresponding to an evaluation prompt included in the candidate image. Hence, the vision language model uses the evaluation prompts to identify whether different visual features are present or are absent from the candidate image, with the evaluation questions in the selected template specifying the visual features for the candidate image.

The online system 140 determines 335 whether the evaluation results satisfy one or more criteria. In various embodiments, evaluation results that do not satisfy a criterion identify a discrepancy between the candidate image and the collection of items. Different criterion may correspond to different discrepancies between the candidate image and the collection of items in various embodiments. For example, in response to determining 335 the evaluation results do not satisfy a particular criterion, the online system 140 identifies a discrepancy between the candidate item and the collection of items, as the candidate image does not include a visual feature corresponding to an evaluation prompt. As another example, in response to determining 335 the evaluation results do not satisfy a criterion, the online system 140 determines 335 the evaluation results identify a discrepancy between the candidate item and the collection of items, as the candidate image includes an additional item that is not in the collection of items. In an additional example, the online system 140 identifies a discrepancy between the candidate image and the collection of items in response to determining 335 the evaluation results do not satisfy a criterion specifying a threshold number of visual features visible to users in the candidate image.

In response to identifying one or more discrepancies between the candidate image and the collection of items, from determining 335 whether the candidate image satisfies one or more criteria, the online system 140 stores a description of one or more identified discrepancies between the candidate image and the collection of items. For example, the online system 140 stores an identifier of an additional item not included in the collection of items that is identified as included in the candidate image when determining 335 whether the candidate image satisfies the one or more criteria. As another example, the online system 140 stores an identifier of a visual feature corresponding to an evaluation prompt that was not identified in the candidate image.

Based on one or more discrepancies between the candidate image and the collection of items when determining 335 whether the evaluation results satisfy one or more criteria, the online system 140 generates 340 an image generation modification prompt. In various embodiments, the image generation modification prompt includes the previously generated 310 image generation prompt, the descriptive information of the collection of items, the items included in the collection of items, and the identified one or more discrepancies. The online system 140 may include the descriptive information of the collection of items, the items in the collection of items, the image generation prompt, and the identified discrepancies between the candidate image and the collection of items in a prompt for a generative model that generates 340 the image generation modification prompt from the received data. In various embodiments, the image generation modification prompt includes the previously generated image generation prompt, the descriptive information of the collection of items, the items of the collection of items, the one or more identified discrepancies, and an instruction to modify the image generation prompt to remedy the identified one or more discrepancies between the candidate image and the collection of items. For example, the image generation modification prompt includes an instruction to remove one or more additional items identified in the candidate image that were not included in the collection of items. As another example, the image generation modification prompt includes an instruction to add one or more characteristics (e.g., items of the collection of items, characteristics of the collection of items, etc.) to the candidate image that correspond to one or more visual features that were not identified in the candidate image.

The online system 140 applies the image generation model to the image generation modification prompt to generate 345 a modified candidate image, as further described above. Because the image generation modification prompt includes instructions to remedy one or more identified discrepancies between the candidate image and the collection of items, one or more characteristics of the modified candidate image differ from characteristics of the candidate image. For example, the modified candidate image includes one or more different visual features than the candidate image. The online system 140 generates 330 evaluation results for accuracy of the modified candidate image using the evaluation prompts generated 325 from the evaluation questions in the selected template, the descriptive information of the collection of items, and items included in the collection of items, as further described above. Subsequently, the online system 140 determines 335 whether the evaluation results generated 330 for the modified candidate image satisfy the one or more criteria, as further described above. This allows the online system 140 to iteratively generate 340 modified candidate images that remedy discrepancies between the modified candidate image and the collection of items in response to evaluation results for a candidate image not satisfying one or more criteria (or not satisfying at least a threshold amount of criteria), which indicates one or more discrepancies between the candidate image, or a modified candidate image, and the collection of items. In some embodiments, the online system 140 generates modified candidate images based on identified discrepancies until determining 335 whether evaluation results for accuracy of a modified candidate image identifies less than a threshold number of discrepancies from the collection of items. Alternatively, the online system 140 iteratively generates modified candidate images a threshold number of times to increase an accuracy of the modified candidate image in depicting the collection of items.

However, in response to determining 335 the evaluation results for candidate image (or the modified candidate image) satisfies the one or more criteria (or satisfies at least a threshold amount of the criteria), the online system 140 stores 350 the candidate image (or the modified candidate image) as an image associated with the collection of items. Subsequently, when generating an interface displaying information describing the collection of items, the online system 140 presents the image associated with the collection of items in the interface. Storing the candidate image (or the modified candidate image) as the image associated with the collection of items in response to the evaluation results for accuracy of the candidate image satisfying the one or more criteria (or satisfying a threshold amount of the one or more criteria) results in the online system 140 storing 350 an image including at least a threshold amount of visual features specified by the evaluation questions for the type of the collection of items in association with the collection of items. This increases an accuracy of an image for the collection of items generated by the online system 140 accurately depicting the collection of items to users, which increases a likelihood of a user subsequently selecting the collection of items or selecting items included in the collection of items.

Figure 4:
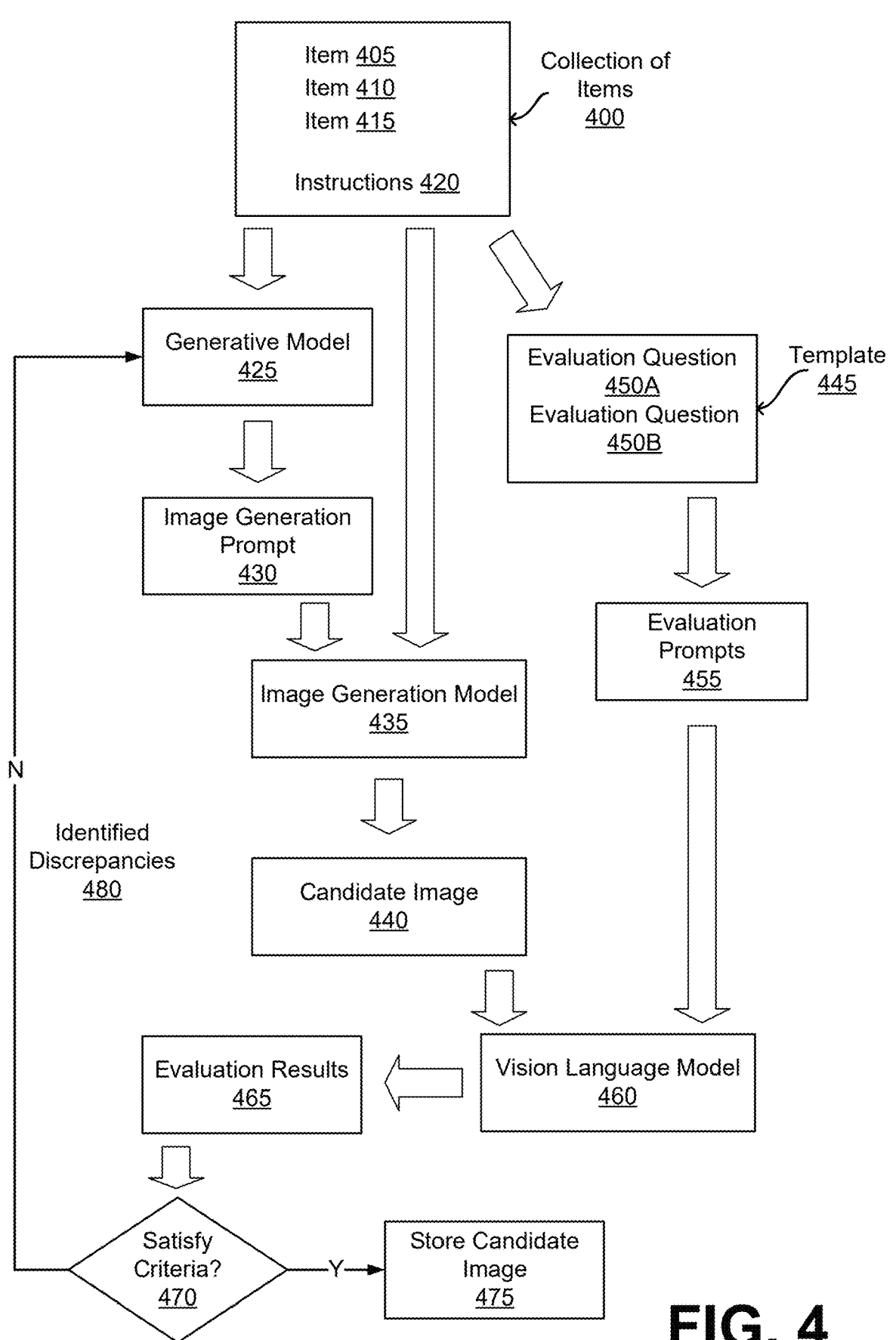
FIG. 4 illustrates a process flow diagram of a method for generating an image of a collection of items by modifying an image generated by an image generation model based on evaluation results of the image generated by a vision language model, in accordance with one or more embodiments.

FIG. 4 is a process flow diagram of a method for generating an image of a collection of items by modifying an image generated by an image generation model based on evaluation results of the image generated by a vision language model. An online system 140 allows users to obtain various items via the online system 140. For example, a user creates an order for the online system 140 including one or more items offered by the online system 140. Subsequently, the online system 140 fulfills the order by obtaining the items included in the order and having the items delivered to a location specified by the order. For example, the online system 140 allocates an order from the user to a picker, who obtains items included in the order from a source and delivers the items to a location specified in the order.

To simplify order creation, the online system 140 may maintain various collections of items. Each collection of items includes a plurality of items and descriptive information about the collection. In various embodiments, descriptive information included in a collection of items includes instructions for combining items in the collection to create a product. For example, a collection of items is a recipe identifying different food items and including instructions for combining the food items in the recipe to create a product that is a dish created from combining the food items. Examples of descriptive information included in a collection of items include: keywords associated with the collection, a category associated with the collection, one or more users associated with the collection, one or more primary items included in the collection, etc. For purposes of illustration, FIG. 4, shows an example collection 400 of items including item 405, item 410, item 415, and descriptive information comprising instructions 420 for combining item 405, item 410, item 415. In various embodiments, the descriptive information includes different or additional information than instructions 420 for combining items in the collection 400 of items.

When presenting information describing the collection 400 of items to users via an interface, the online system 140 presents an image associated with the collection 400 of items along with other information describing the collection. Presenting the image associated with the collection 400 increases a likelihood of the user obtaining items included in the collection 400 of items. In various embodiments, the image associated with the collection 400 of items depicts a product resulting from combining items included in the collection 400 of items. For example, an image associated with a collection of items comprising a recipe is an image of a dish created combining food items in the recipe based on instructions included in the recipe.

To generate an image associated with the collection 400 of items for presentation to users, the online system 140 applies a generative model 425, such as a large language model (LLM), to a prompt including the items included in the collection 400, the descriptive information included in the collection 400 of items, and one or more formatting instructions for an image generation prompt 430. In various embodiments, one or more formatting instructions specify that the image generation prompt 430 includes: a name of the collection 400, one or more items in the collection 400 to present in an image, and characteristics of content to include in the image (i.e., a background of the image, etc.). However, different or additional instructions may be specified for inclusion in the image generation prompt 430 by the generative model 425. In various embodiments, the image generation prompt 430 specifies one or more specific items from the collection 400 of items (e.g., one or more primary items in the collection of items), one or more characteristics of the collection 400 of items, information identifying the collection 400 of items, or other information identified from the items and the descriptive information included in the collection of items to include in the candidate image 440. As further described above in conjunction with FIG. 3, the online system 140 generates a candidate image 440 for the collection 400 of items by applying a trained image generation model 435 to the image generation prompt 430, to the items included in the collection 400 of items, and to the descriptive information about the collection 400 of items (e.g., the instructions 420 for combining the items in the collection 400).

While the image generation model 435 accounts for items in the collection 400 and descriptive information in the collection 400 when generating the candidate image 440, the candidate image 440 generated by the image generation module 435 may have one or more discrepancies from the collection 400 of items. An example discrepancy comprises the candidate image 440 not visually presenting one or more items included in the collection 400. Another example discrepancy comprises the candidate image 440 visually presenting one or more additional items that are not included in the collection 400 of items. Hence, discrepancies cause content presented by the candidate image 440 to differ from the items included in the collection 400 of items, which prevents the candidate image 440 from accurately depicting the items included in the collection 400. For example, a candidate image 440 generated for a collection of items comprising a recipe may present a dish created by combining food items in the recipe as well as one or more additional items that were included in the recipe. Discrepancies between the candidate image 440 and the collection 400 of items may reduce a likelihood of a user basing an order for items on the collection 400 of items. Conventional online systems use manual comparison of the candidate image 440 to the collection 400 of items to identify discrepancies between the candidate image 440 and the collection 400 of items, increasing an amount of time and an amount of resources used for determining an image to associate with the collection 400 of items.

To mitigate potential discrepancies between the candidate image 440 and the collection 400 of items, the online system 140 determines a type of the collection 400 of items and selects a template 445 corresponding to the determined type, as further described above in conjunction with FIG. 3. A type of collection includes collections having one or more common characteristics. For example, different types correspond to collections having different types of items or having different instructions for combining items. In some embodiments, a collection 400 includes one or more primary items, and a type of collection corresponds to a specific primary item. Alternatively or additionally, different types of collections of items correspond to different instructions in a collection for combining items in the collection. Other types of collections of items correspond to other characteristics of collections of items, allowing the online system 140 to account for various characteristics of the collection 400 of items when determining the type of the collection 400 of items.

As further described above in conjunction with FIG. 3, each type of collection of items is associated with a template 445 that includes a set of evaluation questions for an image of a collection of items having the type. Different types of collections of items are associated with different templates, with different templates including different evaluation questions. Each evaluation question in the template 445 identifies a visual feature of an image of a collection, and different evaluation questions correspond to different visual features of the image. A "visual feature" of an image is a generic description of certain content included in the image that includes characteristics of one or more items in a collection visible in an image. For example, a visual feature identifies a category of an item visible in the image and one or more attributes of the item of the identified category visible in the image. In an example, an evaluation question identifies a category including a specific item in the collection as a particular attribute of the item included in the identified category. The attribute of an item in a category identified by the evaluation question may be based on the collection 400 of items in some embodiments. For example, an evaluation question identifies a category of items and indicates that an item of the identified category matches at least one item included in the collection 400 of items.

Maintaining different templates that include different sets of evaluation questions for different types of collections of items allows the online system to account for variations in visual features for images associated with different types of collections of items. Because different types of collections have different items and differently combine the items, different visual features in images provide users with accurate representations of different types of collections of items. For example, accurate representation of a collection comprising a pasta recipe includes different visual features in an image than the visual features included in an image generated for a different collection comprising a drink recipe. In the example of FIG. 4, based on the type of the collection 400 of items, the online system 140 selects template 445, which includes evaluation question 450A and evaluation question 450A (also referred to individually and collectively using reference number 450).

Based on the evaluation questions 450A, 450B in the template 445 selected for the collection 400 of items and the candidate image 440 for the collection 400 of items, the online system 140 determines whether the candidate image 440 has one or more discrepancies from the collection 400. For example, the online system 140 applies a vision language model 460 to each combination of an evaluation question 450 in the selected template 445 and the candidate image 440 to generate evaluation results 465 for accuracy of the candidate image 440, with the evaluation results 465 indicating whether the candidate image 440 has one or more discrepancies between the collection 400 of items and the candidate image 440. In various embodiments, the online system 140 generates an evaluation prompt 455 for each evaluation question 450 by applying the generative model 425 to an evaluation question 450, to items 405, 410, 415 in the collection 400, and to descriptive information included in the collection. For example, the online system 140 applies the generative model 425 to a prompt including an evaluation question 450, the items 405, 410, 415 in the collection 400, and the descriptive information in the collection 400, with the generative model 425 generating an evaluation prompt 455 mapping specific items or characteristics of the collection 400 to generic descriptions of one or more visual features in the evaluation question 450. Use of the generative model 425 (e.g., a large language model) to generate one or more evaluation prompts 455 is further described above in conjunction with FIG. 3.

As further described above, each evaluation question 450 includes a generic description of a visual feature of the image, allowing the evaluation question 450 to be broadly applicable to various collections of items having a type corresponding to the template 445 including the evaluation question 450. An evaluation prompt 455 based on an evaluation question 450 includes one or more specific items from the collection 400 (or specific characteristics of the collection 400, or specific attributes of an item of the collection 400) corresponding to each generic description of a visual feature, so the evaluation prompt 455 is tailored to the specific items included in the collection 400 of items. In various embodiments, the online system 140 generates an evaluation prompt 455 for each evaluation question 450. For example, the online system 140 generates an evaluation prompt 455 for evaluation question 450A and an evaluation prompt 455 for evaluation question 450B in the example of FIG. 4.

Applying the vision language model 460 to each combination of the candidate image 440 and an evaluation prompt 455 generates evaluation results 465 for accuracy of the candidate image 440, as further described above in conjunction with FIG. 3. The vision language model 460 comprises a multimodal generative model that receives an image and text data as input. The vision language model 460 generates an output based on the received image and text data. For example, the vision language model 460 generates text data based on the received image and text data. For example, the evaluation prompt 455 queries the vision language model 460 to indicate whether the candidate image 440 displays content corresponding to a visual feature, with an evaluation result 465 comprising the indication whether the candidate image 440 displays the visual feature corresponding to the evaluation prompt 455 from the vision language model 460. As another example, the evaluation results 465 comprise identifiers of items included in the collection 400 of items that are not visible in the candidate image 440. In another example, the evaluation results 465 comprise identifiers of additional items included in the candidate image 440 that are not included in the collection 400 of items. In various embodiments, an evaluation result 465 comprises an answer to a question comprising an evaluation prompt 455 that the vision language model 460 generates based on the candidate image 440. Alternative or additional types of evaluation results 465 may be generated by the vision language model 460 in various embodiments.

The online system 140 determines 470 whether the evaluation results 465 satisfy one or more criteria to determine whether the candidate image 440 has one or more discrepancies from the collection 400 of items. For example, the online system 140 determines 470 whether the evaluation results indicate less than a threshold number of items included in the collection 400 of items are not visible in the candidate image 440. In another example, the online system 140 determines 470 whether the candidate image 440 has less than a threshold number of additional items not in the collection 400 of items visible. However, in other embodiments, the online system 140 determines 470 whether the evaluation results 465 satisfy alternative or additional criteria.

In response to determining 470 the evaluation results 465 do not satisfy one or more criteria, the online system 140 identifies one or more discrepancies between the candidate image 440 and the collection 400 of items corresponding to the one or more criteria that are not satisfied. In various embodiments, the online system 140 stores information describing one or more criteria that the candidate image 440 does not satisfy, with a criterion that the candidate image 440 does not satisfy identifying a discrepancy between the candidate image 440 and the collection 400 of items. For example, the online system 140 stores an identifier of an item identified by an evaluation prompt 455 that is not visible in the candidate image 440. As another example, the online system 140 stores an identifier of an additional item included in the candidate image 440 That is not included in the collection 400 of items. In an additional example, the online system 140 stores an identifier of an attribute of an item identified by an evaluation prompt 455 that is not visible in the candidate image 440. Hence, determining 470 whether the candidate image 440 satisfies one or more criteria identifies one or more discrepancies between the candidate image 440 and the collection 400 of items.

In response to determining 470 the evaluation results 465 satisfy the criteria or satisfy At least a threshold amount of the criteria, the online system stores 475 the candidate image as an image associated with the collection 400 of items. Evaluation results 465 satisfying at least a threshold amount of the criteria indicates the candidate image 440 has less than a threshold number of discrepancies from the collection 400 of items, so the online system 140 determines the candidate image 440 accurately represents the collection 400 of items and stores 475 the candidate image 440 as the image associated with the collection 400 of items. Subsequently, the online system 140 displays the image associated with the collection 400 of items as a portion of information identifying the collection 400 of items. Leveraging the set of evaluation questions 450 in the template 445 selected for the collection 400 of items and the vision language model 460 allows the online system 140 to confirm that the candidate image 440 generated by the image generation model 435 has less than a threshold number of discrepancies from the collection 400 of items, which confirms the candidate image 440 accurately represents the collection 400 of items.

However, in response to determining 470 the evaluation results 465 do not satisfy at least a threshold amount of the criteria, the online system 140 applies the generative model 425 to one or more discrepancies 480 identified from comparing the evaluation results 465 to the one or more criteria. In various embodiments, the online system 140 generates an image generation modification prompt including the previously generated image generation prompt 430, the items in the collection 400 of items, the descriptive information of the collection 400 of items (e.g., the instructions 420 for combining the items in the collection 400), the identified one or more discrepancies 480, and an instruction to modify the image generation prompt 430 to remedy the identified one or more discrepancies between the candidate image 440 and the collection 400 of items. As further described above in conjunction with FIG. 3, the generative model 425 receives a prompt including the previously generated image generation prompt 430, the items in the collection 400 of items, the descriptive information of the collection 400 of items (e.g., the instructions 420 for combining the items in the collection 400), the identified one or more discrepancies 480, and an instruction to modify the image generation prompt 430 to remedy the identified one or more discrepancies between the candidate image 440 and the collection 400 of items and generates the image generation modification prompt. Subsequently, the online system 140 generates a modified candidate image by applying the image generation model 435 to the modified image generation prompt.

The online system 140 generates evaluation results 465 for the modified candidate image by applying the vision language model 460 to each combination of the modified candidate image and an evaluation prompt 455 (or an evaluation question 450 from the template 445), as further described above. The online system 140 determines 470 whether the evaluation results 465 for the modified candidate image satisfy the one or more criteria, as further described above. In response to determining 470 the evaluation results 465 for the modified candidate image satisfy the one or more criteria (e.g., satisfy at least a threshold amount of the criteria), the online system 140 stores 475 the modified candidate image as the image associated with the collection 400 of items. However, in response to determining 470 the evaluation results 465 for the modified candidate image do not satisfy the criteria (e.g., do not satisfy at least a threshold amount of the criteria), the online system 140 determines the modified candidate image includes greater than a threshold number of discrepancies from the collection of items and generates an additional modified image generation prompt using the identified discrepancies 480 from comparison of the evaluation results 465 of the modified candidate image to the one or more criteria and the generative model 425 as further described above. Using the additional modified image generation prompt and the image generation model 435, the online system 140 generates an additional modified candidate image. Based on the additional modified candidate image and the evaluation prompts 455 (or evaluation questions 450), the online system generates evaluation results 465 for the additional modified candidate image, as further described above. The online system 140 determines 470 whether the evaluation results 465 for the additional modified candidate image satisfy the one or more criteria, as further described above.

Hence, the online system 140 may iteratively modify the candidate image 440 generated for the collection 400 of items by the image generation model 435 based on discrepancies 480 between the candidate image 440 and the collection 400 of items identified by the vision language model 460 based on the candidate image 440 and evaluation prompts 455 corresponding to visual features of an image for the collection 400 of items. In some embodiments, the online system 140 modifies the candidate image 440 until a modified candidate image has evaluation results 465 satisfying at least a threshold amount of the one or more criteria to minimize discrepancies between the modified candidate image stores 475 as the image associated with the collection 400 of items. Alternatively, the online system 140 modifies the candidate image 440 a predetermined number of times based on comparison of the evaluation results 465 to the one or more criteria before storing the resulting modified candidate image 440 as the image associated with the collection 400 of items. Such iterative modification of the candidate image 440 generated by the image generation model 435 leverages the vision language model 460 and the generative model 425 to automate generation of the candidate image 440 for the collection 400 of items and modification of the candidate image 440 to reduce discrepancies with the collection 400 of items prior to storing the a version of the candidate image 440 in association with the collection 400 of items.

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

obtaining, at the computer system, descriptive information for a collection of items and items included in the collection of items;

generating an image generation prompt based on the items included in the collection of items and the descriptive information for the collection of items;

generating a candidate image for the collection of items by applying an image generation model to the image generation prompt, wherein the image generation model comprises a generative artificial intelligence (AI) model;

identifying a type of the collection of items based on the items included in the collection of items and the descriptive information for the collection of items;

selecting a template for the collection of items based on the type, the template including a set of evaluation questions, each evaluation question identifying a visual feature of an image associated with the collection of items;

applying a vision language model to combinations of the candidate image and each evaluation question included in the selected template, the vision language model outputting a set of evaluation results for accuracy of the candidate image, wherein applying the vision language model causes the vision language model to output an evaluation result of the set of evaluation results that comprises one or more of:

identifiers of one or more additional items included in the candidate image that are not included in the collection of items, or identifiers of one or more items included in the collection of items that are not visible in the candidate image;

identifying that the evaluation results satisfy at least a threshold criteria; and in response to the computer system identifying the evaluation results satisfy at least the threshold criteria, storing the candidate image as the image associated with the collection of items.

2. The method of claim 1, wherein applying the vision language model to combinations of the candidate image and each evaluation question included in the selected template comprises:

generating an evaluation prompt for each evaluation question of the selected template by applying the vision language model to each evaluation question of the selected template, the items included in the collection of items, and the descriptive information of the collection of items; and generating the evaluation results by applying the vision language model to each evaluation prompt and the candidate image.

3. The method of claim 2, wherein selecting a template comprises selecting a template including an evaluation question that includes a generic description of the visual feature, and an evaluation prompt corresponding to the evaluation question identifies one or more specific items from the collection of items or specific characteristics of the collection of items corresponding to the generic description.

4. The method of claim 1, further comprising:

generating an image generation modification prompt in response to the computer system identifying that the evaluation results do not satisfy at least the threshold criteria, the image generation modification prompt including one or more discrepancies between the candidate image and the collection of items identified from comparing the evaluation results to the one or more criteria;

generating a modified candidate image having one or more visual features differing from visual features of the candidate image by applying the image generation model to the image generation modification prompt;

generating evaluation results for accuracy of the modified candidate image based on application of the vision language model to combinations of the modified candidate image and each evaluation question included in the selected template; and in response to the computer system identifying the evaluation results satisfy at least the threshold criteria, storing the modified candidate image as the image associated with the collection of items.

5. The method of claim 4, wherein generating the image generation modification prompt comprises including, in the image generation modification prompt, an instruction to remedy the discrepancies between the candidate image and the collection of items identified from comparing the evaluation results to the one or more criteria.

6. The method of claim 1, wherein obtaining descriptive information for a collection of items and items included in the collection of items comprises obtaining instructions for combining the items included in the collection to create a product.

7. The method of claim 6, wherein generating the candidate image for the collection of items comprises generating an image of the product from combining the instructions included in the collection.

8. A computer program product comprising a non-transitory computer readable storage medium having instructions encoded thereon that, when executed by one or more processors of a computing system, cause the one or more processors to perform steps comprising:

obtaining, at the computer system, descriptive information for a collection of items and items included in the collection of items;

generating an image generation prompt based on the items included in the collection of items and the descriptive information for the collection of items;

generating a candidate image for the collection of items by applying an image generation model to the image generation prompt, wherein the image generation model comprises a generative artificial intelligence (AI) model;

identifying a type of the collection of items based on the items included in the collection of items and the descriptive information for the collection of items;

selecting a template for the collection of items based on the type, the template including a set of evaluation questions, each evaluation question identifying a visual feature of an image associated with the collection of items;

applying a vision language model to combinations of the candidate image and each evaluation question included in the selected template, the vision language model outputting a set of evaluation results for accuracy of the candidate image, wherein applying the vision language model causes the vision language model to output an evaluation result of the set of evaluation results that comprises one or more of:

identifiers of one or more additional items included in the candidate image that are not included in the collection of items, or identifiers of one or more items included in the collection of items that are not visible in the candidate image;

identifying that the evaluation results satisfy at least a threshold criteria; and in response to the computer system identifying the evaluation results satisfy at least the threshold criteria, storing the candidate image as the image associated with the collection of items.

9. The computer program product of claim 8, wherein applying the vision language model to combinations of the candidate image and each evaluation question included in the selected template comprises:

generating an evaluation prompt for each evaluation question of the selected template by applying the vision language model to each evaluation question of the selected template, the items included in the collection of items, and the descriptive information of the collection of items; and generating the evaluation results by applying the vision language model to each evaluation prompt and the candidate image.

10. The computer program product of claim 9, wherein selecting a template comprises selecting a template including an evaluation question that includes a generic description of the visual feature, and an evaluation prompt corresponding to the evaluation question identifies one or more specific items from the collection of items or specific characteristics of the collection of items corresponding to the generic description.

11. The computer program product of claim 8, wherein the non-transitory computer readable storage medium further has instructions encoded thereon that, when executed by the processor, cause the processor to perform steps comprising:

generating an image generation modification prompt in response to the computer system identifying that the evaluation results do not satisfy at least the threshold criteria, the image generation modification prompt including one or more discrepancies between the candidate image and the collection of items identified from comparing the evaluation results to the one or more criteria;

generating a modified candidate image having one or more visual features differing from visual features of the candidate image by applying the image generation model to the image generation modification prompt;

generating evaluation results for accuracy of the modified candidate image based on application of the vision language model to combinations of the modified candidate image and each evaluation question included in the selected template; and in response to the computer system identifying the evaluation results satisfy at least the threshold criteria, storing the modified candidate image as the image associated with the collection of items.

12. The computer program product of claim 11, wherein generating the image generation modification prompt comprises including, in the image generation modification prompt, an instruction to remedy the discrepancies between the candidate image and the collection of items identified from comparing the evaluation results to the one or more criteria.

13. The computer program product of claim 8, wherein obtaining descriptive information for a collection of items and items included in the collection of items comprises obtaining instructions for combining the items included in the collection to create a product.

14. The computer program product of claim 13, wherein generating the candidate image for the collection of items comprises generating an image of the product from combining the instructions included in the collection.

15. A system comprising;

a processor; and a non-transitory computer readable storage medium having instructions encoded thereon that, when executed by the processor, cause the processor to perform steps comprising:

obtaining, at the computer system, descriptive information for a collection of items and items included in the collection of items;

generating an image generation prompt based on the items included in the collection of items and the descriptive information for the collection of items;

generating a candidate image for the collection of items by applying an image generation model to the image generation prompt, wherein the image generation model comprises a generative artificial intelligence (AI) model;

identifying a type of the collection of items based on the items included in the collection of items and the descriptive information for the collection of items;

selecting a template for the collection of items based on the type, the template including a set of evaluation questions, each evaluation question identifying a visual feature of an image associated with the collection of items;

applying a vision language model to combinations of the candidate image and each evaluation question included in the selected template, the vision language model outputting a set of evaluation results for accuracy of the candidate image, wherein applying the vision language model causes the vision language model to output an evaluation result of the set of evaluation results that comprises one or more of:

identifiers of one or more additional items included in the candidate image that are not included in the collection of items, or identifiers of one or more items included in the collection of items that are not visible in the candidate image;

identifying that the evaluation results satisfy at least a threshold criteria; and in response to the computer system identifying the evaluation results satisfy at least the threshold criteria, storing the candidate image as the image asso-
ciated with the collection of items.

16. The system of claim 15, wherein the non-transitory computer readable storage medium further has instructions encoded thereon that, when executed by the processor, cause the processor to perform steps comprising:

generating an image generation modification prompt in response to the computer system determining the evaluation results do not satisfy at least a threshold amount of criteria, the image generation modification prompt including one or more discrepancies between the candidate image and the collection of items identified from comparing the evaluation results to the one or more criteria;

generating a modified candidate image having one or more visual features differing from visual features of the candidate image by applying the image generation model to the image generation modification prompt;

generating evaluation results for accuracy of the modified candidate image based on application of the vision language model to combinations of the modified candidate image and each evaluation question included in the selected template; and storing the modified candidate image as the image associated with the collection of items in response to the computer system determining the evaluation results for accuracy of the modified candidate image satisfy at least the threshold amount of criteria.

* * * * *